(12) United States Patent
Kodate

(10) Patent No.: US 6,509,946 B1
(45) Date of Patent: Jan. 21, 2003

(54) HIGH RESOLUTION TFT LIQUID CRYSTAL DISPLAY DEVICE HAVING A WIDE TFT CHANNEL

(75) Inventor: Manabu Kodate, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 09/620,115

(22) Filed: Jul. 20, 2000

(30) Foreign Application Priority Data

Aug. 5, 1999 (JP) .......................................... 11-222118

(51) Int. Cl.$^7$ ........................................... G02F 1/1343
(52) U.S. Cl. ............................ 349/141; 349/43; 349/46
(58) Field of Search ........................... 349/141, 42, 43, 349/46, 39

(56) References Cited

U.S. PATENT DOCUMENTS 4,679,909 A * 7/1987 Hamada et al. ............. 350/333
4,705,358 A * 11/1987 Yamazaki et al. .......... 350/334

FOREIGN PATENT DOCUMENTS

JP          2-58030         2/1990

* cited by examiner

*Primary Examiner*—Toan Ton
*Assistant Examiner*—Andrew Schechter
(74) *Attorney, Agent, or Firm*—Scully, Scott, Murphy & Presser

(57) ABSTRACT

The present invention provides a high-resolution TFT liquid crystal display device having a structure capable of providing a high aperture ratio and high image quality which have been conflicted with each other in the conventional IPS mode TFT liquid crystal display device.

The target of the present invention is a TFT liquid crystal display device which includes plural pairs of common busline 2 and gate busline 3 each extending in parallel to each other in a definite direction, plural source buslines 4 each extending in parallel to each other in such a direction as to intersect detachedly the common and gate buslines, sub-pixel aperture areas 5 each surrounded by the common busline, the gate busline and the source buslines, and Thin Film Transistors (TFTs) 6. In the present invention, the TFT has a source electrode 11 and a drain electrode 12 disposed in parallel to each other. The crosswise direction of a channel 13 formed by the parallel source and drain electrodes is parallel to the source buslines, and the width of the channel is approximately equivalent to the long side length of the sub-pixel aperture area.

4 Claims, 2 Drawing Sheets

HIGH RESOLUTION TFT LIQUID CRYSTAL DISPLAY DEVICE HAVING A WIDE TFT CHANNEL

BACKGROUND OF THE INVENTION

1. Technical Field

The present invention relates to an active matrix high-resolution liquid crystal display device including plural pairs of common busline and gate busline each extending in parallel to each other in a definite direction, plural source buslines each extending in parallel to each other in such a direction as to intersect detachedly the common and gate buslines, sub-pixel aperture areas each surrounded by the common busline, the gate busline and the source buslines, and Thin Film Transistors (TFTs).

2. Prior Art

There have been known various types of active matrix TFT liquid crystal display devices including plural pairs of gate busline through which a scanning signal is supplied and common busline each extending in parallel to each other in a definite direction; plural source buslines through which an image signal is supplied and which extend in parallel to each other in such a direction as to intersect detachedly the common and gate buslines; sub-pixel aperture areas each surrounded by the common busline, the gate busline and the source buslines; and Thin Film Transistors (TFTs). In case of using such TFT liquid crystal display devices as a display unit of a notebook personal computer (PC) requiring a large aperture ratio, a TN (Twisted Nematic) mode TFT liquid crystal display device is used now since it can afford the large aperture ratio though its viewing angle is bad.

Recently, a large stationary liquid crystal display device has been used as a display device for a normal PC. In this type of the stationary liquid crystal display device, even if the aperture ratio is small, the screen of a display device can be brightened by means of, for example, back light and the like. Accordingly, the viewing angle is important rather than the aperture ratio for this type of the display device. On this account, in recent years, an IPS (In-Plane-Switching) type TFT liquid crystal display device capable of providing a good viewing angle has been used for this purpose.

FIG. 2 shows an embodiment of the aforementioned conventional IPS type TFT liquid crystal display device. In FIG. 2, reference numeral 51 denotes busline constituted by plural pairs of common busline 52 and gate busline 53 each extending in parallel to each other in a definite direction, e.g., in a horizontal direction here; 54 denotes plural source buslines extending in parallel to each other in such a direction as to intersect detachedly these common buslines 52 and gate buslines 53 to make a right angle therewith here; 55 denotes a sub-pixel aperture area surrounded by the common busline 52, the gate busline 53 and the source buslines 54; and 56 denotes TFT. The TFT 56 includes a source electrode 57 and a drain electrode 58. The source electrode 57 extends from the source busline 54. These electrodes are along the gate busline 53 and interspaced in parallel to each other at a definite interval of a channel 59. The gate busline 53 is placed under the channel 59 consisting of a semiconductor layer through the intermediary of an insulating film which is not shown in the figure.

In the embodiment shown in FIG. 2, two pieces of common electrodes 60 are branched from the common busline 52 and extended downwardly along the two pieces of source buslines 54. On the other hand, the drain electrode 58 of the TFT 56 has a branch extending upwardly between adjacent two pieces of the common electrodes 60 in parallel thereto. As a result, plural (two) parallel electrode pairs are constituted in a sub-pixel area. Of course, the aforementioned constitution can be found between a pair of, for example, transparent glass substrates, and the space between these substrates is filled with a liquid crystal similarly to the usual TFT liquid crystal display device even though these are not shown in FIG. 2. The part shown in FIG. 2 corresponds to one of R (Red), G (Green) and B (Blue) sub-pixel areas which constitute one color pixel. In FIG. 2, a row of these three sub-pixel areas constitutes the pixel. Accordingly, it is no need of explaining why the height to width ratio of the sub-pixel area is 3:1.

The conventional TFT liquid crystal display device shown in FIG. 2 has been used without causing serious problems until high resolution is required. Nowadays, a high-resolution liquid crystal display device is required. However, conventional technologies cannot answer this requirement. In other words, when considered for achieving the high resolution on the basis of the same ground rules as conventional, leading ideas will suggest that the aperture ratio of sub-pixel aperture areas inevitably becomes decreased in proportion to the size of a sub-pixel area. Moreover, the number of TFTs to be driven becomes increased because of increasing the number of pixels. Accordingly, time required for driving selected TFT becomes short for activating one sub-pixel area corresponding to the selected TFT since time allowable to be occupied for displaying one frame is determined by a refresh rate. In order to prevent the deterioration of image quality which makes it impossible to form an image in the worst case, it is required to increase the size of TFT even if the aperture ratio of the sub-pixel aperture areas necessarily becomes decreased.

Japanese Patent Laid-Open Hei 2(1990)-58030 discloses a method for solving problems regarding the size of TFT in which the width of the channel of TFT is increased by making source and drain electrodes form a comb-shaped structure. In this structure, teeth of these electrodes facing each other are arranged to run alternately and substantially in parallel to one another on a plane. This method makes it possible to increase the driving ability of the TFT to some extent, but cannot increase the aperture ratio just the same as other conventional methods because it is necessary to form the electrodes into the comb-shaped structure.

The object of the present invention is to provide a high-resolution TFT liquid crystal display device having a structure capable of providing a high aperture ratio and high image quality which have been conflicted with each other in the conventional IPS mode TFT liquid crystal display device.

SUMMARY OF THE INVENTION

The target of the present invention is a TFT liquid crystal display device which includes plural pairs of common busline and gate busline each extending in parallel to each other in a definite direction, plural source buslines each extending in parallel to each other in such a direction as to intersect detachedly the common and gate buslines, sub-pixel aperture areas each surrounded by the common busline, the gate busline and the source buslines, and Thin Film Transistors (TFTs). In the present invention, the TFT has source and drain electrodes disposed in parallel to each other. The crosswise direction of a channel formed by the parallel source and drain electrodes is parallel to the source buslines. The width of the channel is approximately equivalent to the long side length of the sub-pixel aperture area.

In the present invention, the above constitution makes it possible to increase the size of TFT without affecting adversely the aperture ratio of pixels. Thereby, the driving ability and the charging speed of the TFT can be enhanced. More concretely, a pixel is constituted by laterally disposed three sub-pixel aperture areas. Thereby, in each of the sub-pixel aperture areas, the long side of the sub-pixel aperture area lies along the source busline, and is about three times longer than the short side of the same sub-pixel aperture area which lies along the common and gate buslines. Accordingly, the width of the channel can be made about three times wider than the conventional one. As a result, it is possible to run a current enough to compensate the remarkable decrease of changing time required for the pixel. Thereby, it is possible to maintain a high quality image. Furthermore, the crosswise direction of the channel is parallel to the source buslines and the width thereof is almost equivalent to the long side length of the sub-pixel aperture area. Thereby, the gate electrode positioned under the channel is located near the source electrode in parallel to the source electrode. Accordingly, it is possible to make the sub-pixel aperture area free from the effect of the source busline potential. Consequently, image quality can be improved further more.

Constituting the source electrode of the TFT as a part of the source busline is involved in the preferred embodiments of the present invention. This makes it possible to increase the aperture ratio more and more. When a common electrode extending in parallel to the drain electrode from the common busline is deposited on the side of the sub-pixel aperture area opposite to the side of the same on which the TFT is formed, lateral electric field is formed between the drain and common electrodes and stable control of the orientation of a liquid crystal can be made depending on the intensity of the electric field. At the same time, the effect of adjacent source buslines in terms of electric potential on the sub-pixel aperture area can be avoided by the common electrode. As a result, a high quality image can be provided. Furthermore, the orientation direction of a liquid crystal in applying no electric field to the liquid crystal is controlled to be pointed from an intersectional corner of the common electrode and the common busline to a corner of the drain electrode positioned near the gate busline. Thereby, stable control of the orientation of the liquid crystal can be made irrelevantly to electric fields formed in the sub-pixel area. As a result, a high quality image can be provided. When the drain electrode is extended in parallel to the gate busline from its corner near the gate busline to form a normal or turnover (like a mirror image) L-shaped structure, stable control of the orientation of the liquid crystal can be promoted. At the same time, the effect of adjacent gate buslines in terms of electric potential on the sub-pixel aperture area can be avoided. As a result, a high quality image can be provided.

BRIEF DESCRIPTION OF THE DRAWINGS

Preferred embodiments of the present invention will now be described, by way of example only, with reference to the accompanying drawings in which.

BRIEF DESCRIPTION OF THE PREFERRED EMBODIMENTS OF THE INVENTION

Figure 1:
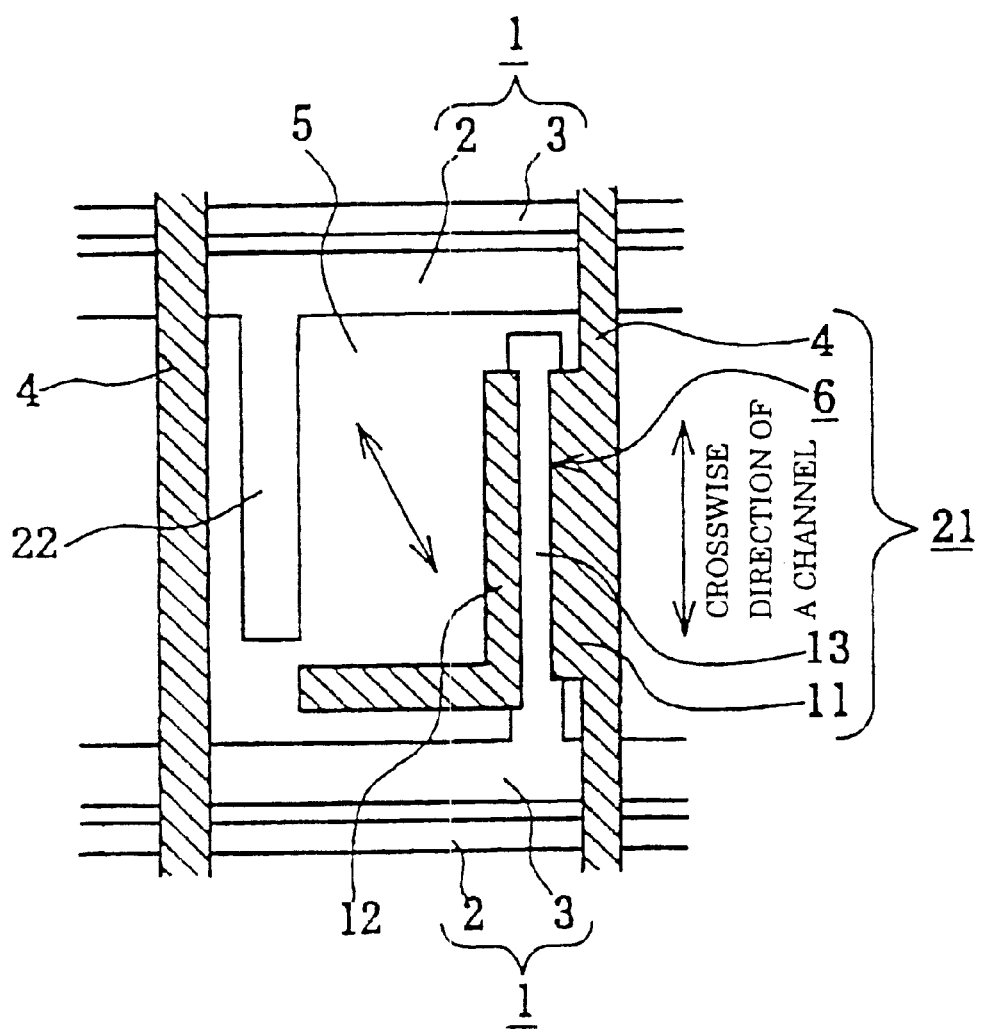
FIG. 1 shows a high-resolution TFT liquid crystal display device embodiment of the present invention.

FIG. 1 shows a high-resolution TFT liquid crystal display device embodiment of the present invention. The part shown in FIG. 1 corresponds to one of R, G and B sub-pixel areas which constitute one color pixel. In other words, a row of these three sub-pixel areas constitutes the pixel. Accordingly, the height to width ratio of the sub-pixel area is designed to be 3:1. In FIG. 1, reference numeral 1 denotes busline constituted by plural pairs of gate busline 3 through which a scanning signal is supplied and common busline 2 each extending in parallel to each other in a definite direction, e.g., in a horizontal direction here; 4 denotes plural source buslines which extend in parallel to each other in such a direction as to intersect detachedly these common buslines 2 and gate buslines 3 to make a right angle therewith here and through which an image signal is supplied; 5 denotes a sub-pixel aperture area surrounded by the common busline 2, the gate busline 3 and the source buslines 4; and 6 denotes TFT.

In the example shown in FIG. 1, the TFT 6 has a source electrode 11 and a drain electrode 12 disposed in parallel to each other. The crosswise direction of a channel 13 formed between the parallel source electrode 11 and the drain electrode 12 is parallel to the source buslines 4. The width of the channel 13 is nearly equivalent to the long side 21 length of the sub-pixel aperture area 5. The source electrode 11 involved in the TFT 6 is a part of the source busline 4 and projected inside the sub-pixel aperture area 5 from the source busline 4. A gate electrode 14 is formed under the channel 13, which is usually made up of a semiconductor layer, through the intermediary of an insulating film which is not shown in the figure. The gate electrode 14 is projected from the gate busline 3 and extended upwardly along the source busline 4. In the embodiment shown in FIG. 1, a common electrode 22 branched in parallel to the drain electrode 12 of the TFT 6 from the common busline 2 is located on the side of the sub-pixel aperture area 5 opposite to the side of the same sub-pixel aperture area on which the TFT 6 is formed. The drain electrode 12 is extended in parallel to the gate busline 3 from the corner of the drain electrode 12 itself near the gate busline 3 to form a turnover L-shaped structure (The drain electrode 12 has one portion parallel and adjacent to the gate busline 3 (the lateral hatched portion positioned near the gate busline 3 shown in FIG. 1) and another portion parallel to the under source busline 4 (longitudinal hatched line positioned near the right source busline 4 shown in FIG. 1)).

The pixels having the aforementioned constitution are formed between a pair of, for example, transparent glass substrates. The space between these substrates is filled with liquid crystal similarly to the usual TFT liquid crystal display device even though these are not shown in FIG. 1. Now, the orientation of a liquid crystal will be explained as follows. The orientation direction of a liquid crystal in applying no electric field thereto is controlled to be pointed from an detached intersectional corner of the common electrode 22 and the common busline 2 to a corner of the drain electrode 12 of the TFT positioned near the gate busline 3, or to follow the direction illustrated by an arrow having arrowheads at both ends thereof in FIG. 1. Orientation of a liquid crystal can be achieved by forming an orientation film on upper and lower transparent glass substrates under specified conditions in the well-known manners.

Figure 2:
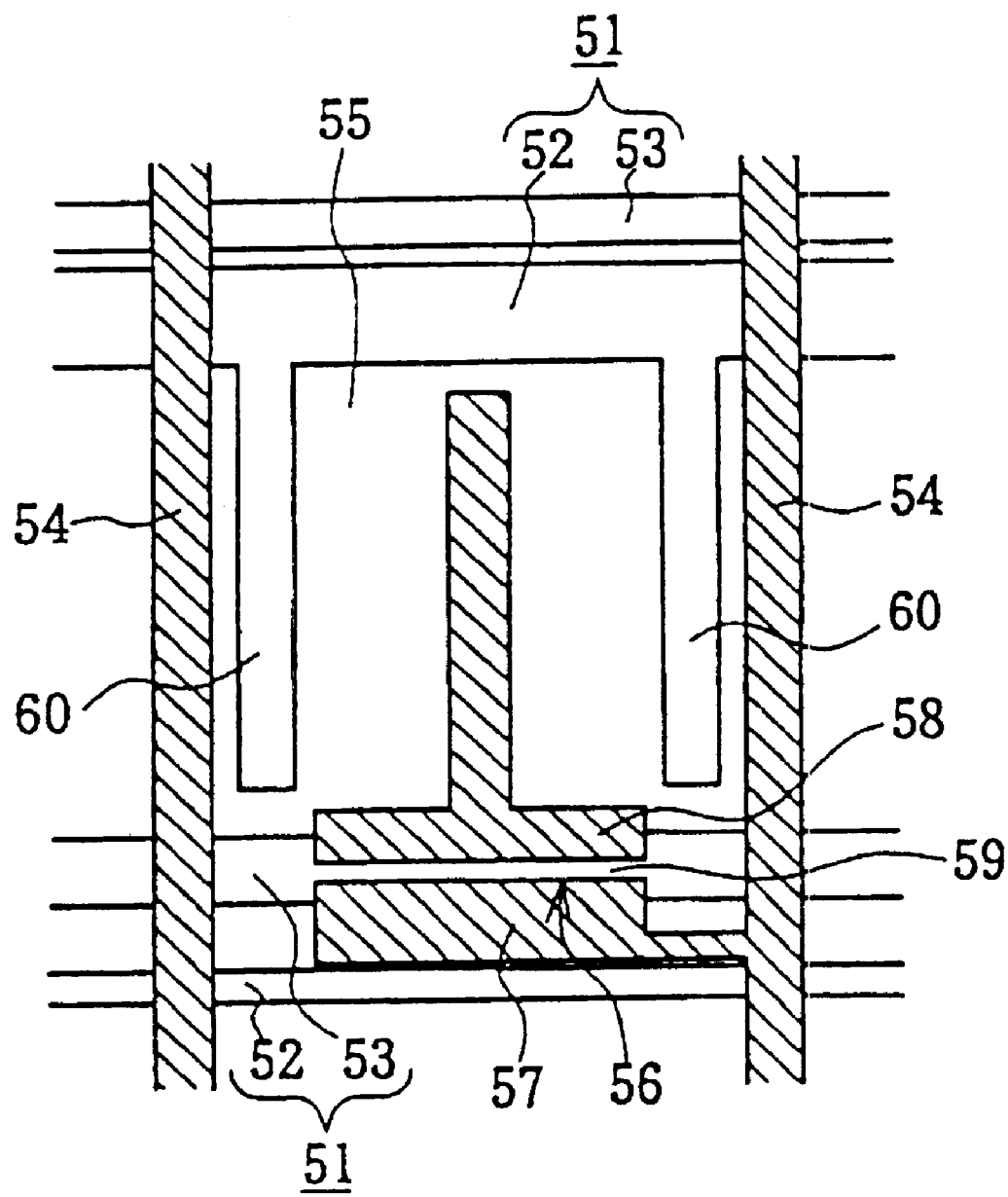
FIG. 2 shows an example of a conventional IPS type TFT liquid crystal display device.

In the high-resolution TFT liquid crystal display device embodiment of the present invention, each of the sub-pixel areas includes deposited single pair of the common electrode 22 and the drain electrode 12 whose faces are opposite in parallel to each other. As such, the sub-pixel area is undivided. This is different from the conventional IPS mode TFT liquid crystal display device having plural parallel electrode pairs disposed in one sub-pixel area as shown in FIG. 2. Furthermore, the width of the channel 13 is adjusted to be nearly equivalent to the length of the long side 21 in the embodiment shown in FIG. 1. This is intended to make the channel width equivalent to the length of the long side 21 as possible as it can be, though it is impossible to make the channel width equivalent to the length of the long side completely.

The present invention is not limited to the above embodiment. Various variations and modifications are possible. For example, the common busline 2 and the gate busline 3 can be replaced by single busline 1 in some case though the busline 1 in the embodiment shown in FIG. 1 is constituted by a pair of the common busline 2 and the gate busline 3. The opposite faces of the source electrode 11 and the drain electrode 12 may be comb-shaped though the channel is formed by flat common and drain electrodes 11 and 12 positioned in parallel to each other in the embodiment shown in FIG. 1. The comb-shaped electrodes make it possible to increase the channel width if the branches of the comb-shaped source and drain electrodes 11 and 12 are disposed alternately in parallel to each other. Overlapping a pixel electrode with a common busline or a common electrode is generally practiced in order to form a storage capacity though no overlapped form of these elements is shown in FIGS. 1 and 2.

As is evident from the above explanation, according to the present invention, driving ability and charging speed can be enhanced by increasing the size of TFT without affecting adversely the aperture ratio of pixels. More concretely, a pixel is constituted by laterally disposed three sub-pixel aperture areas. Thereby, in each of the sub-pixel aperture areas, the long side of the sub-pixel aperture area lies along the source busline, and is about three times longer than the short side of the same sub-pixel aperture area. Accordingly, the channel width can be made about three times longer than the conventional one. As a result, it is possible to run a current enough to compensate the remarkable decrease of changing time required for the pixel. Thereby, it is possible to maintain a high quality image. Furthermore, the crosswise direction of the channel is parallel to the source buslines and almost equivalent to the long side width of the sub-pixel aperture area. Thereby, the gate electrode positioned under the channel is located near the source buslines in parallel thereto. Accordingly, it is possible to make the sub-pixel aperture area free from the effect of the source busline potential. Consequently, image quality can be improved still more.

While the invention has been particularly shown and described with respect to preferred embodiments thereof, it will be understood by those skilled in the art that the foregoing and other changes in form and details may be made therein without departing from the spirit and scope of the invention.

Having thus described my invention, what I claim as new, and desire to secure by Letters Patent is:

1. A high-resolution in-plane-switching (IPS) liquid crystal display device comprising:

plural pairs of common busline and gate busline each extending in parallel to each other in a definite direction;

plural source buslines each extending in parallel to each other in such a direction as to intersect detachedly said common and gate buslines;

sub-pixel aperture areas each surrounded by said common busline, said gate busline and said source buslines;

Thin Film Transistors (TFTs), said TFT being constituted so as to dispose source and drain electrodes in parallel to each other in such conditions that the crosswise direction of a channel formed by said parallel source and drain electrodes is parallel to said source buslines, and that the length of said channel is nearly equivalent to the long side length of said sub-pixel aperture area; and a common electrode extending in parallel to said source electrode from said common busline.

2. The high-resolution liquid crystal display device according to claim 1, wherein said source electrode of the TFT is a part of said source busline.

3. The high-resolution liquid crystal display device according to claim 1, wherein the orientation direction of a liquid crystal in applying no electric field thereto is in a direction pointed from a detached intersectional corner of said common electrode and said common busline to a corner of said drain electrode of the TFT positioned near said gate busline.

4. The high-resolution liquid crystal display device according to claim 1, wherein said drain electrode is extended in parallel to said gate busline from the corner thereof near said gate busline to form a normal or turnover L-shaped structure.

* * * * *

UNITED STATES PATENT AND TRADEMARK OFFICE
CERTIFICATE OF CORRECTION

PATENT NO. : 6,509,946 B1 Page 1 of 1
DATED : January 21, 2003
INVENTOR(S) : Manabu Kodate It is certified that error appears in the above-identified patent and that said Letters Patent is hereby corrected as shown below:

Title page, Item [54] and Column 1, line 1,
"HIGH RESOLUTION" should read -- HIGH-RESOLUTION --

Title page,
Item [74], after "Presser" insert -- , Robert M. Trepp, Esq --
Item [57], delete entire ABSTRACT and insert the following:

--A high-resolution TFT (in-plane-switching) liquid crystal display device includes plural pairs of common busline 2 and gate busline 3 each extending in parallel to each other in a definite direction, plural source buslines 4 each extending in parallel to each other in such a direction as to intersect detachedly the common and gate buslines, sub-pixel aperture areas 5 each surrounded by the common busline, the gate busline and the source buslines, and Thin Film Transistors (TFTs) 6. The TFT has a source electrode 11 and a drain electrode 12 disposed in parallel to each other. The crosswise direction of a channel 13 formed by the parallel source and drain electrodes is parallel to the source buslines, and the width of the channel is approximately equivalent fo the long side length of the sub-pixel aperture area. A common electrode 22 extends in parallel to the source electrode from the common busline.--.

Column 3,
Line 64, "Brief" should read -- Detailed --

Signed and Sealed this

Eleventh Day of November, 2003

JAMES E. ROGAN
*Director of the United States Patent and Trademark Office*